US010957951B2

(12) United States Patent
Brinkmann et al.

(10) Patent No.: US 10,957,951 B2
(45) Date of Patent: Mar. 23, 2021

(54) TEMPERATURE CONTROL DEVICE FOR A BATTERY OF A VEHICLE, VEHICLE HAVING SUCH A TEMPERATURE CONTROL DEVICE AND METHOD FOR CONTROLLING THE TEMPERATURE OF A BATTERY OF A VEHICLE

(71) Applicant: FORD GLOBAL TECHNOLOGIES, LLC, Dearborn, MI (US)

(72) Inventors: Bernd Brinkmann, Dormagen NRW (DE); Thomas Nitsche, Neuss NRW (DE); Christian Jolk, Cologne NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 15/938,277

(22) Filed: Mar. 28, 2018

(65) Prior Publication Data
US 2018/0287230 A1 Oct. 4, 2018

(30) Foreign Application Priority Data
Mar. 28, 2017 (DE) .................. 10 2017 205 193

(51) Int. Cl.
*H01M 10/635* (2014.01)
*B60H 1/00* (2006.01)
(Continued)

(52) U.S. Cl.
CPC ...... *H01M 10/635* (2015.04); *B60H 1/00278* (2013.01); *B60K 1/04* (2013.01);
(Continued)

(58) Field of Classification Search
CPC ............ H01M 10/635; H01M 10/613; H01M 10/6562; H01M 10/625; H01M 10/655;
(Continued)

(56) References Cited

U.S. PATENT DOCUMENTS

| 7,353,900 B2 | 4/2008 | Abe et al. |
| 9,077,019 B2 | 7/2015 | Kosaki et al. |

(Continued)

FOREIGN PATENT DOCUMENTS

DE 102007022298 A1 11/2008

*Primary Examiner* — Gary D Harris
(74) *Attorney, Agent, or Firm* — David B. Kelley; Brooks Kushman P.C.

(57) ABSTRACT

There is provided a temperature control device for a battery of a vehicle which has a battery housing having a battery which is arranged therein and which is intended to have its temperature controlled, and a battery heat transmission device, which are arranged with spacing from each other so as to form an intermediate space, wherein a temperature control medium can be introduced into the intermediate space. The temperature control device further has a delimitation device, an air chamber which is arranged between the battery heat transmission device and the delimitation device, an air inlet opening for supplying ambient air to the air chamber and an air outlet opening for discharging air from the air chamber. In order to increase the efficiency of the battery cooling, it is proposed to construct the air inlet opening so as to be able to be closed. There are further provided a vehicle having such a temperature control device and a method for controlling the temperature of a battery which is arranged in a battery housing of a vehicle by means of a temperature control medium.

6 Claims, 1 Drawing Sheet

(51) Int. Cl.
  *H01M 10/625*   (2014.01)
  *H01M 10/6562*  (2014.01)
  *H01M 10/613*   (2014.01)
  *B60K 1/04*     (2019.01)
  *B60K 11/04*    (2006.01)
  *B60K 11/06*    (2006.01)
  *B60L 58/24*    (2019.01)
  *B60K 11/02*    (2006.01)
  *B60K 1/00*     (2006.01)

(52) U.S. Cl.
  CPC .............. *B60K 11/02* (2013.01); *B60K 11/04* (2013.01); *B60K 11/06* (2013.01); *B60L 58/24* (2019.02); *H01M 10/613* (2015.04); *H01M 10/625* (2015.04); *H01M 10/6562* (2015.04); *B60K 2001/005* (2013.01); *H01M 2220/20* (2013.01)

(58) Field of Classification Search
  CPC ... H01M 10/633; H01M 10/615; B60K 11/02; B60K 11/06; B60K 11/04; B60K 1/04; B60K 2001/005; B60L 58/24; B60L 58/26; B60L 58/27; B60H 1/00278
  USPC ........................................................ 429/120
  See application file for complete search history.

(56) References Cited

U.S. PATENT DOCUMENTS

| | | | |
|---|---|---|---|
| 9,440,555 B2 | 9/2016 | Garfinkel et al. | |
| 2012/0138260 A1* | 6/2012 | Lee ..................... | H01M 10/625 165/41 |
| 2013/0111939 A1 | 5/2013 | Yan | |
| 2014/0205873 A1 | 7/2014 | Klausner et al. | |
| 2014/0315064 A1 | 10/2014 | Katayama et al. | |
| 2015/0360550 A1* | 12/2015 | Berger ..................... | B60K 1/04 180/68.4 |

* cited by examiner

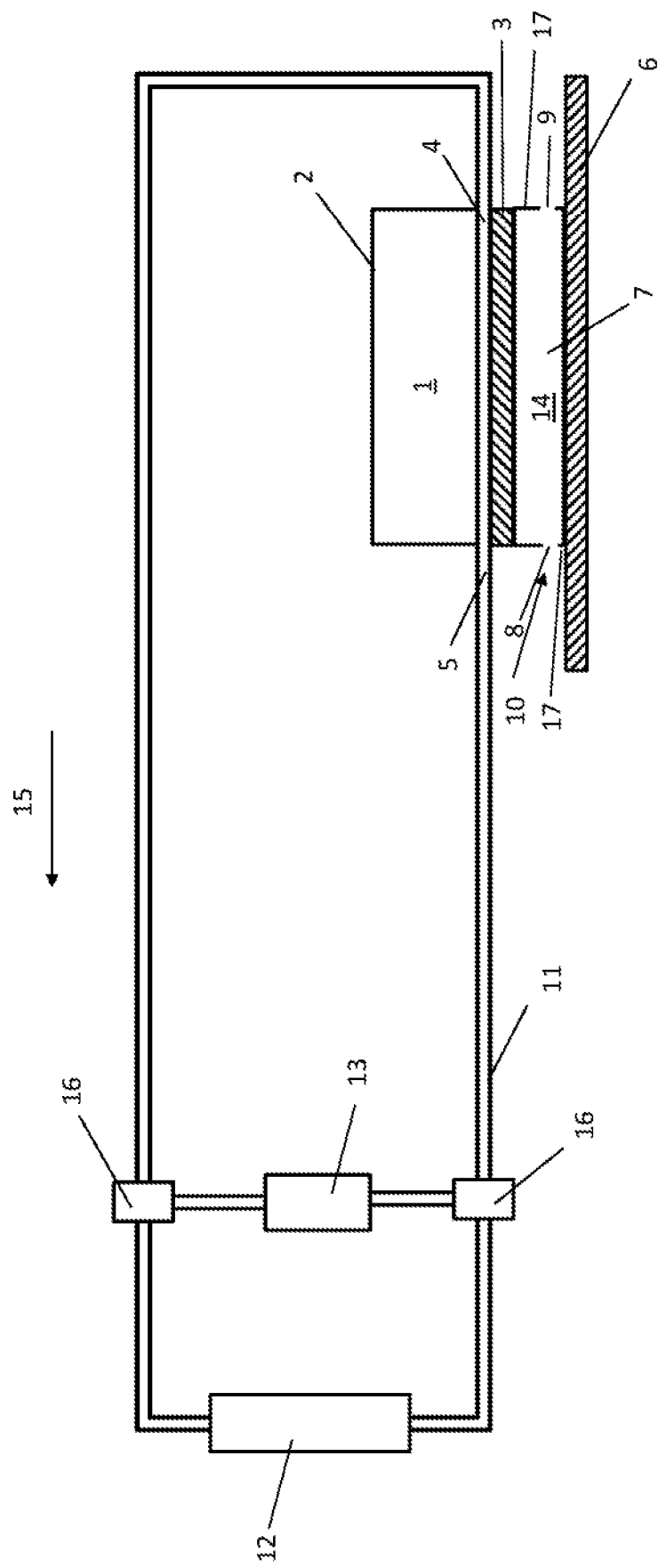

TEMPERATURE CONTROL DEVICE FOR A BATTERY OF A VEHICLE, VEHICLE HAVING SUCH A TEMPERATURE CONTROL DEVICE AND METHOD FOR CONTROLLING THE TEMPERATURE OF A BATTERY OF A VEHICLE

CROSS-REFERENCE TO RELATED APPLICATION

This application claims foreign priority benefits under 35 U.S.C. § 119(a)-(d) to Application DE 10 2017 205 193.0, filed Mar. 28, 2017, which is hereby incorporated by reference in its entirety.

TECHNICAL FIELD

The invention relates to a temperature control device for a battery of a vehicle, a vehicle having such a temperature control device and a method for controlling the temperature of a vehicle battery arranged in a battery housing.

BACKGROUND

In vehicles, accumulators are used as rechargeable stores for electrical energy. In addition to the use as a starter battery, electric and hybrid electric vehicles have traction batteries which are used to electrically drive the vehicle.

These batteries are generally temperature-sensitive and should be operated in a narrow temperature range. Whereas heating the battery can be necessary at cold ambient temperatures, at higher temperatures, for example, above 30° C., it is usually necessary to cool the battery since the battery itself produces heat during operation thereof.

An additional cooling circuit which is independent of the motor cooling circuit is generally used for cooling the battery. At moderate ambient temperatures, that is to say, if a small battery cooling is sufficient, there is activated a first cooling step, at which a temperature control medium, that is to say, in this case, a coolant, is directed to the battery by means of an electric pump, where it absorbs heat. Subsequently, the heated coolant reaches a first heat transmission device, in which it dissipates the absorbed heat to the ambient air. The energy necessary for operating the electrical pump is relatively small.

At high ambient temperatures, however, the cooling effect which can be achieved therewith is not sufficient so that an additional cooling (second cooling step) of the coolant to lower temperatures, for example, to temperatures below the ambient temperature, is necessary. To this end, there can be activated a second heat transmission device, for example, by means of a corresponding valve arrangement and control, which can be arranged, for example, parallel with the first heat transmission device in the cooling circuit. This second heat transmission device is cooled by means of a refrigerating medium, that is to say, the heat absorbed by the coolant is discharged to the refrigerating medium. For example, the refrigerating medium of the air-conditioning system of the vehicle can be used to this end.

If a high level of cooling power is required, that is to say, if the second heat transmission device of the second cooling step is active, the compressor of the air-conditioning device has to provide a suitable refrigerating medium pressure so that ultimately the desired coolant temperature can be reached. To this end, significantly more energy is required than for operating the electrical pump of the first cooling step.

In order to cool the battery, the coolant is generally introduced into an intermediate space, for example, under the battery, which is formed, for example, by the battery housing and a plate fixed thereto. Such a (cooling) plate can also act as a heat transmission device and is referred to below as a battery heat transmission device as a result of the arrangement thereof near the battery. The battery heat transmission device may be produced, for example, from aluminum and serves inter alia to additionally cool the coolant by the battery heat transmission device being flowed around by the travel wind so that heat can be discharged to the ambient air.

However, this cooling action of the battery heat transmission device is provided only as long as the temperature of the coolant is higher than the ambient temperature. If, however, the second cooling step is active, that is to say, the coolant has a temperature below the ambient temperature, the battery heat transmission device in this case brings about no additional cooling of the coolant but instead a heating action. In this case, a large portion of the possible cooling power is lost and is not available for cooling the battery because heat is transmitted from the ambient air to the coolant by means of the battery heat transmission device. As a result, more energy for cooling the battery is required.

SUMMARY

An object of the invention is therefore to provide a method by which the efficiency of the battery cooling can be increased by the energy requirement in particular being reduced.

The invention is based on the basic notion of insulating the battery heat transmission device with respect to the environment if the temperature of the temperature control medium is lower than the ambient temperature or heating of the battery is desired. If the temperature of the temperature control medium is higher than the ambient temperature and cooling of the battery is desired, however, a heat transmission from the temperature control medium to the ambient air is intended to be possible. Under usual conditions, this is generally the case so that the temperature control medium acts as a coolant.

An air-filled chamber (air chamber) can be provided under the battery heat transmission device for the thermal insulation of the battery heat transmission device and therefore the battery. This air chamber can be constructed, for example, between the battery heat transmitter and an underfloor paneling of the vehicle. Such underfloor panelings are generally fitted to the underside of the vehicle in order to reduce the flow resistance. The spacing between the battery heat transmission device and the underfloor paneling may be small and may be, for example, approximately 10 mm.

As a result of the generally rectangular basic shape of the battery heat transmission device and/or the underfloor paneling, a reliable sealing can be produced, for example, by means of a foam seal. Such foam seals are, for example, known from the sealing of conventional cooling packets. An air exchange with the environment is prevented by means of the seal so that an effective insulation can be achieved.

If a heat transmission from the temperature control medium to the ambient air is desired, an air flow in the air chamber is intended to be made possible in order to be able to constantly supply new cooler ambient air. This air flow can be produced, for example, by the travel wind.

In order to be able to produce both functionalities, that is to say, insulation or heat transmission to the ambient air, in accordance with the prevailing conditions, a closable air inlet opening is provided at the beginning, that is to say, at the front end of the air chamber when viewed in the forward travel direction of the vehicle. If insulation is desired, the air inlet opening is closed or becomes closed. If, however, an air flow is desired, the air inlet opening is or becomes opened. The rear end of the air chamber accordingly has an air outlet opening.

A temperature control device according to the invention for a battery of a vehicle, in particular a traction battery of an electric or hybrid electric vehicle, has a battery housing having a battery which is arranged therein and which is intended to have its temperature controlled, and a heat transmission device which are arranged with spacing from each other so as to form an intermediate space. This heat transmission device located near the battery housing is referred to below as a battery heat transmission device.

A temperature control medium, for example, a temperature control fluid, in particular a cooling fluid, can be introduced into the intermediate space, for example, by the intermediate space being connected by means of temperature control medium lines to a temperature control medium store, from which temperature control medium can be conveyed into the intermediate space, for example, by means of a pump. A temperature control medium circuit whose component is or becomes the intermediate space can preferably be or become formed.

In other words, there is formed between the battery housing and the battery heat transmission device an intermediate space in which there can be located a temperature control medium which serves to cool or heat the battery housing and therefore the battery. In most applications, cooling of the battery will be necessary so that the temperature control medium is a coolant, that is to say, a medium for cooling the battery.

The intermediate space may have any shape and may extend, for example, only along one lateral face of the battery housing or may also take up a plurality or all of the lateral faces of the battery housing. In order to improve the heat transmission both between the battery housing and the temperature control medium and between the battery heat transmission device and the temperature control medium, the delimitation faces of the intermediate space can be structured in order to provide a surface which is as large as possible for transmitting heat.

The temperature control device further has a delimitation device. There is arranged between the battery heat transmission device and the delimitation device an air chamber, that is to say, an air-filled chamber or a chamber which is intended to be filled with air, that is to say, the battery heat transmission device and the delimitation device are arranged relative to each other so as to form an air chamber which is therebetween.

Accordingly, at least one lateral face of the battery heat transmission device delimits the intermediate space while at least one additional lateral face of the battery heat transmission device delimits the air chamber. For example, a structure may be produced as follows from the perspective of the situation installed in the vehicle. The battery heat transmission device is arranged above a delimitation device so that the air chamber is constructed therebetween. The outer delimitation of the air chamber may, for example, be achieved by a corresponding shaping of the delimitation device and/or the battery heat transmission device. There may also be provided a different peripheral delimitation of the air chamber, for example, in the form of a seal.

The intermediate space in which the coolant is located or into which the coolant can be introduced is arranged above the battery heat transmission device. The battery housing with the battery which is intended to have its temperature controlled is arranged above the intermediate space.

The temperature of the temperature control medium can be controlled by means of the battery heat transmission device by heat being able to be transmitted from the temperature control medium to the air in the air chamber or vice versa.

The air chamber has an air inlet opening in order to supply ambient air to the air chamber and an air outlet opening in order to discharge air from the air chamber. An air flow can thereby be produced in the air chamber so that a more rapid heat transmission between the temperature control medium and the ambient air is made possible. Air inlet and/or air outlet openings can also be provided.

There is provision according to the invention for the air inlet opening to be able to be closed. It is thereby possible to interrupt the air supply to the air chamber and to impede the heat transmission between the temperature control medium and the ambient air.

A suitable closure element is known, for example, from DE 10 2007 0222 98 A1 and can be constructed so as to be movable by means of a drive. The closure element may be or become formed, for example, by a pivotable flap which projects downward, that is to say, in the direction of the roadway, beyond the delimitation device in a pivoted-out state. Alternatively, the closure element may be formed by a linearly movable slide which can close or at least partially release the air inlet opening similarly to a diaphragm. The closure element may also be constructed as a flexible planar element which can be deformed by bending so that the air inlet opening is released or closed to a greater or lesser extent.

It is advantageous to close the air inlet opening if heating of the battery is desirable, that is to say, the discharge of heat from the temperature control medium to the ambient air is intended to be prevented to the greatest possible extent, or if a particularly high cooling power is necessary. In the latter case, the temperature control medium has a lower temperature than the ambient air so that the heat transmission from the ambient air to the temperature control medium is intended to be substantially prevented.

By the air supply to the air chamber being prevented, a heat transmission occurs only between the air which is already located in the air chamber and the temperature control medium. Subsequently, the air located in the at least partially closed air chamber acts in a thermally insulating manner as a result of the low thermal conductivity thereof and impedes further heat transmission between the environment and the temperature control medium.

Therefore, the device according to the invention allows heat to be transmitted between the temperature control medium and the ambient air as required.

According to different construction variants, the delimitation device may be an underfloor paneling of a vehicle so that the air chambers are arranged between the battery heat transmission device and the underfloor paneling. Since vehicles usually have an underfloor paneling in order to improve the aerodynamic properties, this component which is present can be used as a delimitation device. An additional separate delimitation device is unnecessary in this case, which contributes to a minimization of the vehicle weight and the production costs.

According to additional construction variants, an outer peripheral delimitation of the air chamber can be or become formed by means of a seal between the battery heat transmission device and the delimitation device. For example, a foam seal may be involved. Such a seal allows particularly good sealing of the air chamber with respect to the environment and can be readily fitted, where applicable even subsequently. For example, in the event that the delimitation device is an underfloor paneling of the vehicle, the spacing between the battery heat transmission device and the underfloor paneling may be in many cases only approximately 10 mm. Such a small spacing can be bridged and sealed particularly easily by means of a seal, in particular a foam seal. Particularly closed-cell foam is further distinguished by a particularly weak thermal conductivity so that good insulation can be achieved.

According to additional construction variants, the air outlet opening may also be closable. In the closed state, an air exchange between the air chamber and the environment can thereby be prevented even more effectively so that better thermal insulation can be achieved.

According to additional construction variants, the temperature control device can further have a control device for opening and closing the air inlet opening or the air inlet and air outlet opening, wherein the control can be carried out in accordance with the temperature of the temperature control medium and/or the temperature of the ambient air. This allows automatic opening and closing of the openings depending on whether a heat transmission between the temperature control medium and the ambient air is desirable or not.

If, for example, the temperature of the temperature control medium is lower than the temperature of the ambient air, a heat transmission can be prevented with regard to cooling the battery as effectively as possible by at least the air inlet opening being or becoming closed. If the temperature of the temperature control medium is higher than the temperature of the ambient air and if cooling of the battery is still desired, however, a heat transmission can be enabled by the air inlet and air outlet openings being or becoming opened.

Furthermore, the temperature control device may optionally have a heat transmission device for transmitting heat between the temperature control medium and the ambient air, referred to above as the first heat transmission device, and/or a heat transmission device for transmitting heat between the temperature control medium and a refrigerating medium, referred to above as the second heat transmission device.

In this case, separate heat transmission devices which can also be arranged remote from the battery are involved. For example, these additional heat transmission devices may be located in the motor compartment while the battery can be arranged under the vehicle inner space. In this case, the intermediate space and the heat transmission device for transmitting heat between the temperature control medium and the ambient air and/or the heat transmission device for transmitting heat between the temperature control medium and the refrigerating medium are connected to each other by means of temperature control medium lines so as to form a temperature control medium circuit.

The additional heat transmission devices serve to control the temperature of the temperature control medium, that is to say, either to cool the temperature control medium by transmitting heat from the temperature control medium to a refrigerating medium or to cool or heat the temperature control medium by transmitting heat to the ambient air or from the ambient air to the temperature control medium.

Both additional heat transmission devices described may also be present. In this case, both are preferably arranged parallel with each other so that the temperature control medium circuit is or becomes formed by including one of the two additional heat transmission devices.

The additional heat transmission devices allow the temperature of the temperature control medium to be controlled as required. As described in the introduction, under normal conditions the use of the heat transmission device for transmitting heat between the temperature control medium and the ambient air may be sufficient. Such a heat transmission device is particularly distinguished by a low energy consumption level.

At very high temperatures of the ambient air, however, it may be necessary to cool the temperature control medium to temperatures below the temperature of the ambient air, to which end the heat transmission device for transmitting heat between the temperature control medium and the refrigerating medium may be used, which is, however, connected with a substantially higher energy consumption level.

For reasons involving costs and weight, attempts will in future be made to dispense with the heat transmission device for transmitting heat between the temperature control medium and the ambient air so that the cooling of the temperature control medium in any case would have to be brought about by means of the second heat transmitter. In order to minimize the energy consumption, in this case insulation of the battery heat transmission device may be particularly important.

A vehicle according to the invention has a temperature control device with the features described above. In particular, an electric or hybrid electric vehicle, for example, a mild hybrid electric vehicle or a full hybrid electric vehicle may be involved.

A method according to the invention serves to control the temperature of a vehicle battery which is arranged in a battery housing, in particular a traction battery of an electric or hybrid electric vehicle by means of a temperature control medium.

To this end, there is provision for the temperature control medium to be directed into an intermediate space between the battery housing and a heat transmission device, referred to below as a battery heat transmission device, for heat to be transmitted between the temperature control medium located in the intermediate space and the battery housing and for heat to be transmitted by means of the battery heat transmission device between the temperature control medium located in the intermediate space to air into an air chamber which is arranged between the battery heat transmission device and a delimitation device.

In the event that a heat transmission is intended to be brought about according to the invention between the temperature control medium and the ambient air, ambient air is supplied to the air chamber and air is discharged from the air chamber and, in the event that a heat transmission is not intended to be brought about between the temperature control medium and the ambient air, no ambient air is supplied to the air chamber.

The method according to the invention can be carried out, for example, by means of the above-explained device according to the invention. In this regard, the above explanations for explaining the device according to the invention also serve to describe the method according to the invention.

According to different construction variants, the temperature control medium can be directed to an additional heat transmission device for transmitting heat between the temperature control medium and the ambient air, referred to in the introduction as the first heat transmission device, wherein heat is transmitted by means of this heat transmission device from the temperature control medium to the ambient air and the cooled temperature control medium is directed back into the intermediate space.

According to additional construction variants, the temperature control medium can be directed to an additional heat transmission device for transmitting heat between the temperature control medium and a refrigerating medium, described in the introduction as the second heat transmission device, heat can be transmitted by means of this heat transmission device from the temperature control medium to the refrigerating medium and the cooled temperature control medium can be directed back into the intermediate space.

According to additional construction variants, the supply of the ambient air to the air chamber can be controlled in accordance with the temperature of the temperature control medium and/or the temperature of the ambient air.

The invention is intended to be explained in greater detail below with reference to an embodiment. In the associated drawing:

BRIEF DESCRIPTION OF THE DRAWINGS

FIG. 1 is a schematic illustration of a device according to the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the example explained below, reference is made to the appended drawing which forms a portion of the example and in which a specific embodiment in which the invention can be carried out is shown for illustration. In this regard, directional terms such as, for example, "top", "bottom", "forward", "backward", "front", "rear", etc., are used with reference to the orientation of the described FIGURE. Since components of embodiments can be positioned in a number of different orientations, the directional terminology is for illustrative purposes and is not limiting in any manner.

It will be appreciated that other embodiments can be used and structural or logical changes can be carried out without departing from the protective scope of the present invention. The following description is therefore not intended to be interpreted in a limiting sense and the scope of protection of the present invention is defined by the appended claims.

FIG. 1 illustrates an embodiment of a device according to the invention for cooling a traction battery 1, for example, of a full hybrid vehicle, in the situation installed in the vehicle.

The battery 1 which is intended to be cooled is arranged in a battery housing 2. The battery heat transmission device 3 is located under the battery housing 2 so that an intermediate space 4 is formed between the battery housing 2 and the battery heat transmission device 3 and a temperature control medium 5 can be introduced therein by means of temperature control medium lines 11. The temperature control medium 5 is in the example a commercially available coolant.

A delimitation device 6 is arranged under the battery heat transmission device 3 so that there is formed between the battery heat transmission device 3 and the delimitation device 6 an air chamber 7, in which air 14 is located. In the example, the underfloor paneling of the vehicle acts as the delimitation device 6. The outer peripheral delimitation of the air chamber is formed by a seal 17 which is a foam seal in the example.

The air chamber 7 has an air inlet opening 8 for supplying ambient air 10 to the air chamber 7 via an air outlet opening 9 for discharging air from the air chamber 7. The air inlet opening 8 is located in the front delimitation face of the air chamber 7 when viewed in the forward travel direction 15 of the vehicle so that the ambient air can flow into the air chamber 7 with the air flow which is produced during forward travel movement of the vehicle. The air outlet opening 9 is located in the opposite delimitation face of the air chamber 7. The air inlet opening 8 can be closed.

There are further provided a heat transmission device 12 for transmitting heat between the temperature control medium 5 and the ambient air 10 and a heat transmission device 13 for transmitting heat between the temperature control medium 5 and a refrigerating medium which are connected to the intermediate space 4 by means of temperature control medium lines 11 so as to form a temperature control medium circuit and which are arranged parallel with each other in the temperature control medium circuit. It can be determined by means of valves 16 whether the heat transmission device 12 is intended to be used for transmitting heat between the temperature control medium 5 and the ambient air 10 or the heat transmission device 13 for transmitting heat between the temperature control medium 5 and a refrigerating medium for cooling the temperature control medium.

In order to cool the battery 1, the temperature control medium 5 is introduced into the intermediate space 4 so that heat is transmitted from the battery housing 2 and therefore also from the battery 1 to the temperature control medium 5 in the intermediate space 4.

The heated temperature control medium 5 is subsequently directed by means of temperature control medium lines 11 into the heat transmission device 12 for transmitting heat between the temperature control medium 5 and the ambient air 10 or into the heat transmission device 13 for transmitting heat between the temperature control medium 5 and a refrigerating medium, wherein the selection by means of the valves 16 is carried out in accordance with the temperature of the temperature control medium 5 and the temperature of the ambient air 10.

If the temperature of the ambient air 10 is lower than the temperature of the temperature control medium 5, the temperature control medium 5 can be cooled by means of the ambient air 10. To this end, on the one hand, the heat transmission device 12 is used to transmit heat between the temperature control medium 5 and the ambient air 10 and, on the other hand, the battery heat transmission device 3. In this case, an air flow is desirable in the air chamber 7 so that the air inlet opening 8 is or becomes opened in order to allow a heat transmission from the temperature control medium 5 to the ambient air 10 by means of the battery heat transmission device 3.

If, however, the temperature of the ambient air 10 is higher than the temperature of the temperature control medium 5, the temperature control medium 5 cannot be cooled by means of the ambient air 10. In this case, the temperature control medium 5 is cooled by means of the heat transmission device 13 for transmitting heat between the temperature control medium 5 and a refrigerating medium. Furthermore, a heat transmission by means of the battery heat transmission device 3 is intended to be prevented to the greatest possible extent because in this case heat would be transmitted from the ambient air 10 to the temperature control medium 5 so that a loss of cold would be produced. Accordingly, the battery heat transmission device 3 must be insulated in this case. This is carried out by the air inlet opening 8 being or becoming closed so that no ambient air 10 can flow into the air chamber 7. Furthermore, the air outlet opening 9 should also be or become closed so that the air 14 which is enclosed in the air chamber 7 acts in a thermally insulating manner with respect to the delimitation device 6 and the ambient air 10.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A battery system for a vehicle comprising:
   a battery;
   a heat transmission device spaced from the battery such that an exterior surface of the heat transmission device adjacent to the battery and the battery define form a gap configured to receive a temperature control medium; and
   an underfloor paneling spaced from the heat transmission device such that the underfloor paneling and an exterior surface of the heat transmission device closest to the underfloor paneling define an air chamber between the underfloor paneling and heat transmission device, the air chamber having an air inlet and air outlet that are selectively closable based on temperatures of the temperature control medium and ambient air.

2. The battery system of claim 1 further comprising a controller configured to, responsive to the temperature of ambient air being greater than the temperature of the temperature control medium, close the air inlet and air outlet.

3. The battery system of claim 1 further comprising a second heat transmission device configured to exchange heat between the temperature control medium and air.

4. The battery system of claim 1 further comprising a second heat transmission device configured to exchange heat between the temperature control medium and a refrigerant.

5. The battery system of claim 1 further comprising temperature control medium lines configured to deliver the temperature control medium to the gap.

6. The battery system of claim 1 further comprising a controller configured to, responsive to the temperature of ambient air being less than the temperature of the temperature control medium, open the air inlet and air outlet.

* * * * *